United States Patent [19]
Glocker et al.

[11] Patent Number: 5,789,145
[45] Date of Patent: Aug. 4, 1998

[54] ATMOSPHERIC PRESSURE GLOW DISCHARGE TREATMENT OF BASE MATERIAL FOR PHOTOGRAPHIC APPLICATIONS

[75] Inventors: David A. Glocker, West Henrietta; Mark M. Romach, Rochester; Richard C. Soper, Victor, all of N.Y.

[73] Assignee: Eastman Kodak Company, Rochester, N.Y.

[21] Appl. No.: 685,353

[22] Filed: Jul. 23, 1996

[51] Int. Cl.$^6$ .................................................. G03C 1/85
[52] U.S. Cl. .................. 430/527; 430/523; 430/524; 430/530; 430/531; 430/532; 430/631; 430/935; 430/950; 430/961
[58] Field of Search .................. 430/523, 527, 430/524, 531, 530, 532, 631, 935, 950, 961; 422/186.05, 907; 428/195

[56] References Cited

U.S. PATENT DOCUMENTS

| | | | |
|---|---|---|---|
| 3,411,908 | 11/1968 | Crawford et al. | 96/74 |
| 3,531,314 | 9/1970 | Kerr et al. | 117/34 |
| 3,582,339 | 6/1971 | Martens et al. | 96/87 |
| 3,607,345 | 9/1971 | Thomas et al. | 117/34 |
| 3,630,742 | 12/1971 | Crawford et al. | 96/87 |
| 3,782,947 | 1/1974 | Krall | 96/67 |
| 3,837,886 | 9/1974 | Tatsuta et al. | 117/34 |
| 3,860,427 | 1/1975 | Matsuo et al. | 96/87 |
| 3,874,877 | 4/1975 | Omichi et al. | 96/87 |
| 3,888,753 | 6/1975 | Kiikka et al. | 204/168 |
| 4,055,685 | 10/1977 | Bayer et al. | 96/87 |
| 4,087,574 | 5/1978 | Yamaguchi et al. | 427/407 |
| 4,229,523 | 10/1980 | Ohta et al. | 430/532 |
| 4,241,169 | 12/1980 | Work, III et al. | 430/532 |
| 4,279,945 | 7/1981 | Audran et al. | 427/130 |
| 4,363,872 | 12/1982 | Ealding | 430/532 |
| 4,394,442 | 7/1983 | Miller | 430/532 |
| 4,429,032 | 1/1984 | Matthe et al. | 430/231 |
| 4,446,110 | 5/1984 | Ahlbrandt | 422/186 |
| 4,451,497 | 5/1984 | Dolezalek et al. | 427/39 |
| 4,518,681 | 5/1985 | Johnson et al. | 430/532 |
| 4,676,195 | 6/1987 | Yasui et al. | 118/723 |
| 4,701,403 | 10/1987 | Miller | 430/529 |
| 4,990,276 | 2/1991 | Bishop et al. | 252/62.54 |
| 4,993,267 | 2/1991 | Allard et al. | 73/726 |
| 5,004,669 | 4/1991 | Yamada et al. | 430/264 |
| 5,147,768 | 9/1992 | Sakakibara | 430/501 |
| 5,217,804 | 6/1993 | James et al. | 428/329 |
| 5,229,259 | 7/1993 | Yokota | 430/523 |
| 5,244,780 | 9/1993 | Strobel et al. | 430/535 |
| 5,255,031 | 10/1993 | Ikenoue | 354/106 |
| 5,295,039 | 3/1994 | Nakajima et al. | 361/225 |
| 5,316,739 | 5/1994 | Yoshikawa et al. | 422/186 |
| 5,425,980 | 6/1995 | Grace et al. | 430/532 |
| 5,558,843 | 9/1996 | Glocker et al. | 422/186.05 |
| 5,582,921 | 12/1996 | Grace et al. | 430/530 |
| 5,585,229 | 12/1996 | Kawamoto et al. | 430/533 |

FOREIGN PATENT DOCUMENTS

94/28568  12/1994  WIPO.

*Primary Examiner*—Geraldine Letscher
*Attorney, Agent, or Firm*—Arthur H. Rosenstein

[57] ABSTRACT

The present invention is a method for treating a polyester support such as polyethylene naphthalate or polyethylene terephthalate. The treatment is carried out at atmospheric pressure in a gas of helium and optionally nitrogen and/or oxygen. The treatment uses metallic electrodes and an atmospheric glow discharge results when the electrodes are connected to a generator and spaced about 1 to 2 mm apart. The process and apparatus improve adhesion of subsequently coated emulsions on the polyester support at high speeds and relatively low power by selecting a frequency of 40 kHz to 500 kHz.

27 Claims, 2 Drawing Sheets

ATMOSPHERIC PRESSURE GLOW DISCHARGE TREATMENT OF BASE MATERIAL FOR PHOTOGRAPHIC APPLICATIONS

FIELD OF THE INVENTION

This invention describes an improved process for treating photographic support with electrical discharges at atmospheric pressure to promote the adhesion of subsequent coated layers.

BACKGROUND OF THE INVENTION

Corona discharges are used widely in industry to promote adhesion between various materials. In manufacturing photographic products there is a large body of literature describing various applications of coronas to make aqueous and non-aqueous coatings adhere to substrate materials. Almost all of these coronas are produced by applying a high voltage (approximately 5–10 kV), relatively high frequency (10 kHz) signal to electrodes in air at atmospheric pressure. See, for example, U.S Pat. Nos. 4,241,169; 4,701,403; 4,087,574; 4,429,032; 4,363,872; 4,229,523; 4,394,442; 3,411,908; 3,531,314; 3,582,339; 3,607,345; 3,630,742; 3,860,427; 3,874,877; 3,888,753; 4,055,685; 4,518,681; 5,004,669; FR Patent 76 13034; EP Application 92303556.2. There are limitations to the usefulness of corona treatments, however. Coronas produce locally energetic discharges, known commonly as streamers, and these streamers may cause a non-uniform level of treatment. They may also be related to an inhomogeneous loss of red speed in photographic emulsions which produces a mottle defect. Furthermore, coronas appear to be effective at promoting adhesion of coatings to polyethylene, but are relatively ineffective at promoting the adhesion of layers to various polyester supports such as PET, PEN, etc.

A more controllable and effective way of preparing polymers for coating is with low pressure glow discharge treatments. Glow discharges are, by nature, very diffuse and homogeneous, producing a more uniform treatment. Moreover, by controlling the gas it is possible to improve the adhesion of photographic layers to materials such as polyesters as well as polyethylene. See, for example, U.S. Pat. Nos. 4,993,267; 3,837,886; and 4,451,497. A major disadvantage in glow discharge treatments done at reduced pressures is the problem of maintaining a low pressure at the treatment station. It is necessary to use either a batch process, in which the support is loaded into a chamber and the air is removed, or an in-line process, which requires that the support pass through a differential pressure region. In the first case, the support must go through an additional off-line step before the coatings are applied. This is unattractive from a product-flow perspective and requires additional capital. The second choice is difficult and expensive to implement because of the very tight tolerances needed to maintain the pressure differentials in the transport path. This requires expensive and complicated hardware and pumps. The closer to atmospheric pressure that these treatments can be done, the simpler and less costly the process becomes.

It is known that under the right conditions, stable diffuse glow discharges can be produced at atmospheric pressures. Work in this area has been limited and directed primarily at etching of photoresist and deposition of materials. However, there are references to treatments for adhesion (WO 94/28568). Many reports indicate that a reliable method of producing diffuse glow discharges at atmospheric pressures is to use helium as the discharge gas. The work reported in the literature has been reproduced and found to be reliable. Furthermore, Yoshikawa et al (U.S. Pat. No. 5,316,739) have described devices to be used to treat rubber at atmospheric pressure with helium and mixtures of helium with other gases. They use power supplies ranging in frequency from dc to 13.56 Mhz, and show no advantage to be gained by using a particular frequency or small range of frequencies. However, we have found that by using trace amounts of active gases in novel discharge device, at certain frequencies stable atmospheric pressure discharges can be produced which can dramatically improve the adhesion of photographic emulsions to difficult to coat materials such as polyethylene, PET, and PEN.

In U.S. Ser. No. 08/299,776 filed Sep. 1, 1994 a method of treating a polymeric support comprising a first electrode having a first surface, the first electrode having a plurality of spaced apart holes adjoining the first surface, positioning a second electrode, having a second surface spaced apart from the first surface of the first electrode, pumping gas through the holes wherein the gas is greater than or equal to atmospheric pressure, the gas comprising helium and optionally oxygen and/or nitrogen, coupling power to the first electrode having a frequency of 10 kHz to 50 Mhz, and positioning a web between the first surface of the first electrode and the second surface of the second electrode wherein the polymeric web is subjected to atmospheric glow discharge to improve the adhesive properties was disclosed.

The above method has been found to be very useful, but it is quite important in photographic systems to be able to run film at extremely fast rates, such as 5 feet per minute or above and at comparatively low power densities, such as 5 watts per square centimeter or less.

In U.S. Ser. No. 08/600,568 filed Feb. 13, 1996 was described a preferred combination of treatment gases and treatment frequencies that allow the use of the above device at higher than expected speeds and lower than expected power densities. Specifically, the gas comprises helium and optionally oxygen and/or nitrogen. Particularly effective and fast treatments are possibly when the power supply operates at a frequency of between 40 kHz and about 500 kHz.

One disadvantage of using the technique described in the aforementioned filings is the need for a treatment electrode fabricated with a plurality of closely-spaced holes. Making such an electrode requires precision machining, leading to considerable cost. Furthermore, it is matched to a particular drum electrode, and is not interchangeable with other diameter drums. There would be considerable advantages to being able to use standard corona discharge treatment devices, many of which are already in-place throughout photographic manufacturing operations, to achieve the same results described in these previous filings.

SUMMARY OF THE INVENTION

The present invention describes the use of conventional corona discharge treatment hardware, and improved hardware, operating with specific gases and gas mixtures and with power supplies within a specific frequency range, in order to achieve adhesion in photographic systems by treating at high speeds.

The present invention comprises a method of treating a polymeric support at atmospheric pressure comprising:
  providing one or more metallic active electrodes arranged to face a drum shaped metallic electrode;
  pumping a gas comprising helium to the drum shaped metallic electrode;
  connecting a power supply having a frequency between 40 kHz and 500 kHz between the active electrodes and the drum electrode, transporting a polymeric web-shaped material over the drum shaped electrode so that it is exposed to the atmospheric glow discharge produced by the active electrodes.

A particularly preferred embodiment of the invention involves treating a polymeric support by;

providing one or more metallic active electrodes arranged to face a drum shaped metallic electrode;

providing a gas comprising helium through gas distribution bars containing slits which may distribute flow to the electrode arrangement wherein the slits are sealed to the electrodes;

connecting a power supply having a frequency between 40 kHz and 500 kHz between the active electrodes and the grounded electrode; and transporting a polymeric web-shaped material over the drum shaped electrode so that it is exposed to the atmospheric glow discharge produced by the active electrodes.

The present invention provides the advantage of improving the adhesive properties of a polyester substrate using a glow discharge device which can be maintained economically and these operations can be maintained at atmospheric pressures while maintaining a higher speed of support treatment at relatively low power density.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

Figure 1:
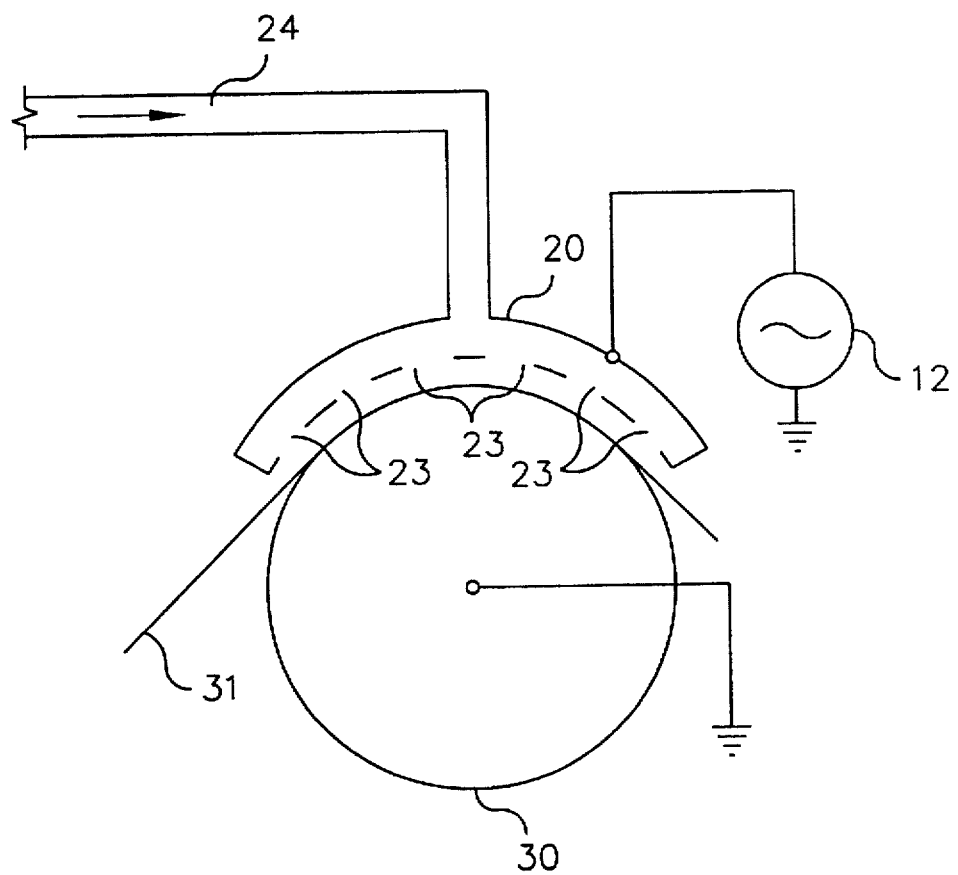
FIG. 1 is an illustration of a prior art electrode.

FIG. 1 shows a sectional view of the atmospheric glow discharge apparatus used in U.S. Ser. No. 08/600,568 filed Feb. 13, 1996. Electrode 20 includes a series of apertures 23 through which the gas is supplied through inlet 24. The dimensions of electrode 20 are 12.1 cm by 13.3 cm. Electrode 20 has 333 apertures 23 each having a 1 mm diameter. The apertures are symmetrically distributed on the electrode 20. A stable glow discharge at atmospheric pressure with high percentages of reactive gas species, most notable $N_2$ and $O_2$ in He, is possible using the electrode 20 shown in FIG. 1. This allows for a more complete treatment of the polyester substrate at low power. The perforated electrode configuration shown in FIG. 1 can be operated in ambient air with a mixture of 8% $N_2$ in He being supplied through the apertures 23.

It is essential in the treatment of polymeric supports to enhance the adhesivity using a transport speed as high as possible with a power as low as possible. As all photographic processes are carried out at extremely high speed to maintain adequate cost consideration and ample supply, it is critical to be able to attain the desired adhesivity at higher web speed. This is extremely difficult where mixtures of gas as described in U.S. Ser. No. 08/299,776 are used at various speeds of from 1 to 30 ft. per minute. As the speed of the web increased many of the gas mixtures did not retain equal adhesive properties.

It is also critical to use the lowest power possible because large power requirements increase the capital costs and can thermally damage the web being treated. The power density is defined as the power delivered to the treatment electrode divided by the area of the treatment electrode and is measured in watts per square centimeter.

It has been found herein that effective treatments at ratios of web speed in ft./min. to power density in $W/cm^2$ of 1:1 or higher can be attained only at frequencies of from 40 kHz to 500 kHz.

Figure 3:
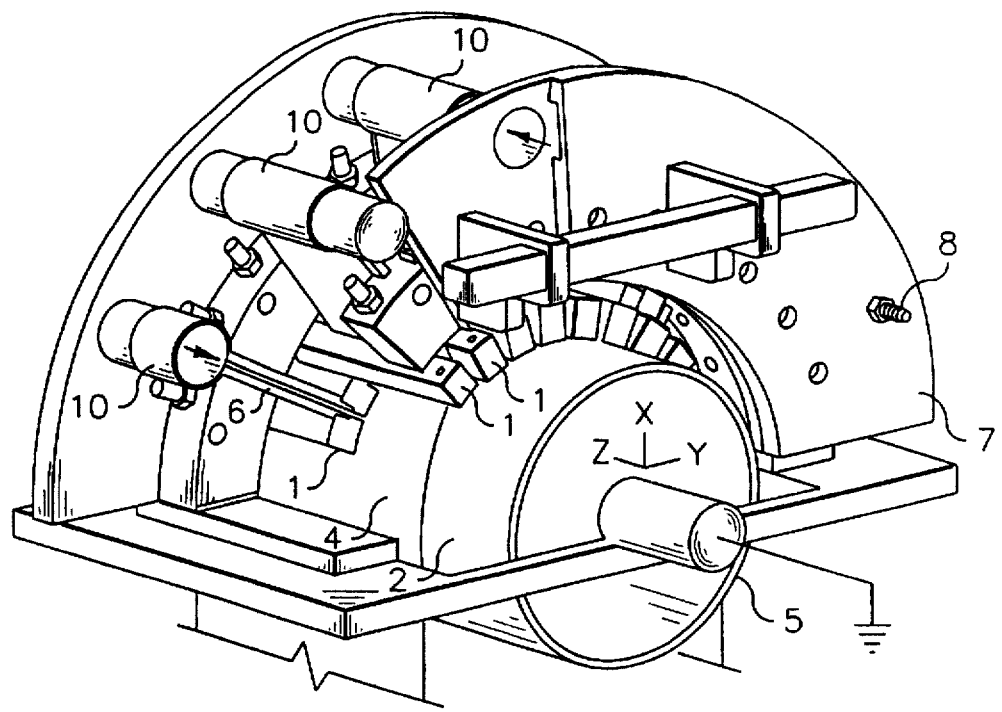
FIG. 3 is an illustration of a particularly preferred corona discharge treatment apparatus, as used in the present invention.

As it is critical to be able to use equipment which does not require the holes of the apparatus of FIG. 1, the present invention is described in FIG. 3.

Figure 2:
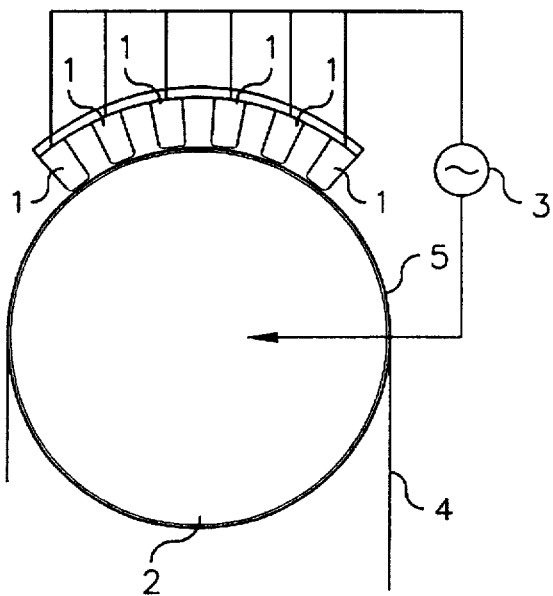
FIG. 2 is an illustration of a conventional corona discharge treatment apparatus.

FIG. 2 is a schematic representation of a conventional covered roll Corona Discharge Treatment (CDT) station. CDT is a common method for treating plastic webs to render them wettable and adherent to inks and other materials coated in fluid form. The common mode for corona discharge is to operate in air. The breakdown voltage for air is such that the necessary field strengths are typically achieved by operating with small air gaps between the energized electrode and ground with high (3 to 15 KV) voltages applied. Corona charging devices achieve high field strength by virtue of small radius points or narrow gauge wires, which means that close proximity to surfaces is not important, however high currents and high power are not appropriate for such wire electrode devices. Thus corona treatment of flat webs with flat surfaced electrodes (1) and small electrode to web gaps is a natural, common, and expected application. The other aspect of corona discharge treatment is that destructive arcs will occur at high power unless runaway currents are stopped. This is typically done with dielectric barrier layers (5) capable of withstanding voltages of 15 KV or more, and thus atmospheric discharges with dielectric layers are often called barrier discharges. A necessary characteristic is that significant power can only be generated with alternating current, so typical corona discharge treaters operate with 3 KHz to 40 KHz power supplies (3). In order to be consistent in treatment, the air gaps in corona discharge treaters have to remain constant, thus typical applications to web treatment involve the use of rollers (2) to position the web (4) with electrodes (1) circumferentially located with respect to the roller. The plastic web to be treated might suffice as a barrier but is usually reinforced by a dielectric in the device. If the dielectric is located on the electrode, this defines a generic class of CDT treaters commonly known as bare roll treaters. Covered roll treaters (FIG. 2), another common class of CDT treaters, use a variety of dielectrics (5) located on the roller (2) with easy to fabricate metal electrodes (1). Metal electrodes can commonly found as multiple units of ½" to 1" width, circumferentially located around the roller in order to simplify the maintenance of electrode to web surface gaps. Another common type of metal electrode is a "shoe", which is a single unit contoured to the roller diameter to maintain a constant air gap. Bare roll treaters have suffered a practical difficulty wherein dielectric covered electrodes break from the thermal shock associated with high power density concentrated on the electrode and so cooling air flows have been invented (see U.S. Pat. No. 4,446,110) to lengthen the lifetime of dielectric materials covering the electrodes and to exhaust the common CDT by-product, ozone. Typical treatment doses for corona discharge treaters operating in air are 1 to 4 watt-minutes per square foot. These treatment doses and the materials available for dielectrics mean that successful treatments are possible from 10 to 2000 feet per minute web speeds. The success of CDT in air is limited to web surfaces such as polyethylene with respect to adhesivity of photographic coatings.

The apparatus of the present invention is described in FIG. 3. It is like a standard corona discharge apparatus except that provision has been made to create substantial and uniform gas flow beneath the active electrodes and through the discharge operating at atmospheric pressure or above. The gas is introduced between pairs of electrodes and flows outward substantially displacing the surrounding air and constantly replenishing the desired gaseous composition.

FIG. 3 shows the relationship between the grounded roller (2) and the active electrodes (1) (electrodes to which the power is delivered). The power supply is connected commonly to all the electrodes (1) and to the grounded roller core (2). The roller is covered with an insulating layer (5). The web to be treated (4) is directed over the roller (2) and under the electrodes (1) which are spaced away from the web so that only small gaps remain. Typical gaps are 0.020" to 0.060" with smaller gaps preferred. The process gas enters between electrodes via delivery slits (6) which are sealed to and insulated from the electrodes with silicone rubber. The process gas is forced to flow through the discharge zone between the electrode face and the web to be treated. The process gas is delivered to the slits via tubes (10) for uniform distribution purposes. The tubes are fed from channels in the superstructure (7) and screw adjustments are available to regulate the amount of flow to individual tubes (10). Entrance to the superstructure channels is via inlets(8).

It is obvious that in order to perform, the photosensitive layers in photographic products must adhere to the support onto which they are coated. This adhesion must be adequate both in the dry state and during processing in developer and other solutions. Since photosensitive layers do not normally adhere directly to the polymer supports commonly used, adhesion promoting layers, often called "subbing" layers, are used. These layers adhere well to the support and also facilitate good adhesion between them and the photographic layers. Surface treatments have been discussed which can promote adhesion of the subbing layers to the support polymer, or which can provide adhesion of the photographic layers directly to the support.

In addition to photographic emulsions, other layers can be adhered to the substrate, such as antistatic, magnetic and lubricant layers. Problems associated with electrostatic charge in the manufacture and utilization of imaging elements are well known. The accumulation of charge can result in dirt or dust attraction, producing physical defects. The discharge of accumulated charge during application or use of radiation sensitive layers (photographic emulsions, for example) can produce irregular fog patterns or static marks in the light sensitive layer(s). These static charge problems have become increasingly more severe due to increased photographic emulsion sensitivity, increased coating machine speeds, and increased post-coating drying efficiency. Transport charging results from the tendency of high dielectric materials to accumulate electrical charge when in relative motion to other materials. This results in static charging during coating and post-coating operations, such as slitting and spooling. Static charge build-up may also occur during the use of imaging elements, for example during winding of a roll of photographic film out of and back into a film cassette in an automatic camera. Static discharge during magnetic reading and writing can result in increased bit error rates. These problems can be exacerbated at low relative humidities. Similarly, high speed processing of imaging elements can result in static charge generation. Due to increased demands for static charge control, a wide variety of ionically-conducting and electronically conducting materials have been incorporated into antistatic layers for photographic imaging, magnetic recording and other imaging elements.

As an example of auxiliary layers that can be adhered to the polyester substrate it is well known from various U.S. patents, including U.S. Pat. Nos. 3,782,947; 4,279,945; 4,990,276; 5,217,804; 5,147,768; 5,229,259; 5,255,031; and others that a radiation sensitive silver halide photographic element may contain a transparent magnetic recording layer which can advantageously be employed to record information into and read information from the magnetic recording layer by techniques similar to those employed in the conventional magnetic recording art. The use of a magnetic recording layer for information exchange allows improved photographic print quality through input and output of information identifying the light-sensitive material, photographic conditions, printing conditions, and other information.

Additional auxiliary layers may also be present in the imaging element. These layers may be used for but not limited to abrasion resistant and other protective layers, abrasive containing layers, adhesion promoting layers, curl control layers, transport control layers, lubricant layers, magnetic layers, and other layers for purposes such as improved web conveyance, optical properties, physical properties and durability. An apparatus like that shown in FIG. 3 was operated at two discharge power supply frequencies with several gases and gas mixtures. Polyethylene naphthalate was transported through the treatment zone at several speeds to assess the capability of the process to work in-line with other manufacturing operations, such as the coating of photographic emulsions. The surfaces thus treated were then coated by hand with an antihalation layer which is the first layer in many color photographic systems. After the emulsion was set and dried a series of adhesion tests were run to test the adhesive properties of the treated PEN.

In each of the following cases, the adhesion of the anti-halation layer was assessed in both the wet and dry states. Prior to testing, the coated films were dried for either 72 hours (dry testing) or 336 hours (wet testing) at 22° C. and 40% relative humidity. The dry test was done by attempting to peel the emulsion from the support with adhesive tape in five increasingly aggressive steps. The sequence consists of changing the tape type, tape width, type of scoring tool, type of scoring, and tape peeling speed. Either a high speed (HSS) tool bit or a dissection scalpel was used to scribe a scratch in the emulsion. When patterns ("H" or "#") are used, the HSS bit or scalpel was used to form the pattern in the emulsion surface. A piece of the specific tape was then hand applied and pressed onto the prepared area. The length of the leader, or pull tab, is test specific to further control the peel speed.

The tapes used include 810 (½ inch width), 610 (1 inch width), and 396 (¾ inch width) all manufactured by 3M Company. One of the tool bits may be used to slice the emulsion at the edge of the tape to concentrate the peel stresses to the area under the tape. The peel forces can be spread out by not scribing the edges. In each case, the tape is then peeled such that the peel angle is 90 degrees between the tape and substrate. The speed of the peeling motion is another factor which affects the aggressiveness of the particular test. Two of the tests utilize multiple peels to increase the aggressiveness. A summary of the tests, in order of increasing aggressiveness, is shown in Table 1.

TABLE 1

| Tape Test | Tool | Pattern | Tape | Leader | Edge Slice | Speed | # of Peels |
|---|---|---|---|---|---|---|---|
| D | Scalpel | None | 810 | 0.25" | No | Slow | 1 |
| E | Scalpel | None | 810 | 0.25" | Yes | Fast | 1 |
| F | HHS Bit | H | 810 | 4" | Yes | Fast | 3 |
| G | Scalpel | # | 610 | 4" | Yes | Fast | 3 |
| H | Scalpel | # | 396 | 2" | Yes | Fast | 1 |

The amount of the emulsion removed by the tape is recorded for each condition as a percentage of the original bounded area under the tape and reported in Table 2. A score of 0% removal means that no emulsion was removed under any condition, and is considered necessary for product-quality photographic film. A score of 100% means that there was complete removal under all 5 conditions. A score between 0 and 100% is determined by averaging the removal for all 5 conditions.

The wet adhesion was assessed by placing the coated film in developer solution at a temperature of 38° C. and rubbing it with an abrasive pad (Scotchbrite) while a pressure of 1.0 N/cm$^2$ was applied to the pad. After 60 back and forth cycles under the pad, the amount of emulsion removed was assessed as a percentage of the abraded area. A score of zero removal is considered necessary for product-quality photographic film.

EXAMPLES

The invention will be described in more detail with reference to the following examples, which are not intended to restrict the scope of the invention.

Example 1

The treatment device as shown in FIG. 3 was operated with 40 liters per minute of helium and 4 liters per minute of nitrogen flowing through the electrodes. A power supply operating at a frequency of 450 kHz and a power of 192 watts was used. Polyethylene naphthalate was transported through the treatment zone at a linear speed of 10 feet per minute. Six bare titanium treatment bars, spaced 0.76 mm from the rubber coated drum, were used. After treatment the polyester support was coated and dried as described above. This treatment resulted in 0% removal for both the wet and dry tests.

Example 2

The treatment device as shown in FIG. 3 was operated with 40 liters per minute of helium and 8 liters per minute of nitrogen flowing through the electrodes. A power supply operating at a frequency of 450 kHz and a power of 186 watts was used. Polyethylene naphthalate was transported through the treatment zone at a linear speed of 10 feet per minute. Six bare titanium treatment bars, spaced 0.76 mm from the rubber coated drum, were used. After treatment the polyester support was coated and dried as described above. This treatment resulted in 0% removal for the wet test and 1% removal for the dry test.

Example 3

The treatment device as shown in FIG. 3 was operated with 40 liters per minute of helium alone flowing through the electrodes. A power supply operating at a frequency of 450 kHz and a power of 168 watts was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 0% removal for the wet test and 3% removal for the dry test.

Example 4

The treatment device as shown in FIG. 3 was operated with 40 liters per minute of helium and 8 liters per minute of nitrogen flowing through the electrodes. A power supply operating at a frequency of 450 kHz and a power of 188 watts was used. Polyethylene naphthalate was transported through the treatment zone at a linear speed of 30 feet per minute. Six bar titanium treatment bars, spaced 0.76 mm from the rubber coated drum, were used. After treatment, the polyester support was coated and dried as described above. This treatment resulted in 0% removal for the wet test and 0% removal for the dry test.

Comparative Example 1

The treatment device as shown in FIG. 3 was operated with 8 liters per minute of helium alone flowing through the electrodes. A conventional corona discharge treatment power supply, operating at a frequency of 10 kHz and a power of 400 watts, was used. Polyethylene naphthalate was transported through the treatment zone at a linear speed of 10 feet per minute. Six bare titanium treatment bars, spaced 0.76 mm from the rubber coated drum, were used. After treatment, the polyester support was coated and dried as described above. This treatment resulted in 100% removal for the wet test and 1% removal for the dry test.

Comparative Example 2

The treatment device as shown in FIG. 3 was operated with 8 liters per minute of helium and 0.32 liters per minute of nitrogen flowing through the electrodes. A conventional corona discharge treatment power supply, operating at a frequency of 10 kHz and a power of 468 watts, was used. Polyethylene naphthalate was transported through the treatment zone at a linear speed of 10 feet per minute. Six bare titanium treatment bars, spaced 0.76 mm from the rubber coated drum were used. After treatment, the polyester support was coated and dried as described above. This treatment resulted in 86% removal for the wet test and 0% removal for the dry test.

Comparative Example 3

The treatment device as shown in FIG. 3 was operated with 80 liters per minute of helium and 3.2 liters per minute of nitrogen flowing through the electrodes. A conventional corona discharge treatment power supply, operating at a frequency of 10 kHz and a power of 396 watts, was used. Polyethylene naphthalate was transported through the treatment zone at a linear speed of 10 feet per minute. Six bare titanium treatment bars, spaced 0.76 mm from the rubber coated drum, were used. After treatment, the polyester support was coated and dried as described above. This treatment resulted in 100% removal for the wet test and 2% removal for the dry test.

Comparative Example 4

The treatment device as shown in FIG. 3 was operated with 8 liters per minute of nitrogen alone flowing through the electrodes. A conventional corona discharge treatment power supply, operating at a frequency of 10 kHz and a power of 426 watts, was used. Polyethylene naphthalate was transported through the treatment zone at a linear speed of 10 feet per minute. Six bare titanium treatment bars, spaced 0.76 mm from the rubber coated drum, were used. After treatment, the polyester support was coated and dried as described above. This treatment resulted in 1% removal for the wet test and 2% removal for the dry test.

Comparative Example 5

The treatment device as shown in FIG. 3 was operated with 8 liters per minute of helium alone flowing through the electrodes. A conventional corona discharge treatment power supply, operating at a frequency of 10 kHz and a power of 438 watts, was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 100% removal for the wet test and 2% removal for the dry test.

Comparative Example 6

The treatment device as shown in FIG. 3 was operated with 8 liters per minute of helium and 0.32 liters per minute of nitrogen flowing through the electrodes. A conventional corona discharge treatment power supply, operating at a frequency of 10 kHz and a power of 482 watts, was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 100% removal for the wet test and 0% removal for the dry test.

Comparative Example 7

The treatment device as shown in FIG. 3 was operated with 80 liters per minute of helium and 3.2 liters per minute of nitrogen flowing through the electrodes. A conventional corona discharge treatment power supply, operating at a frequency of 10 kHz and a power of 376 watts, was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 100% removal for the wet test and 1% removal for the dry test.

Comparative Example 8

The treatment device as shown in FIG. 3 was operated with 80 liters per minute of helium alone flowing through the electrodes. A conventional corona discharge treatment power supply, operating at a frequency of 10 kHz and a power of 396 watts, was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 100% removal for the wet test and 1% removal for the dry test.

Comparative Example 9

The treatment device as shown in FIG. 3 was operated in air without any gas flowing through the electrodes, as is the practice in normal operation. A conventional corona discharge treatment power supply, operating at a frequency of 10 kHz and a power of 490 watts, was used. Polyethylene naphthalate was transported through the treatment zone at a linear speed of 30 feet per minute. Six bare titanium treatment bars, spaced 0.76 mm from the rubber coated drum, were used. After treatment, the polyester support was coated and dried as described above. This treatment resulted in 100% removal for the wet test and 1% removal for the dry test.

Table 2 below summarizes the adhesion results for these examples. Also included in the table is untreated support. On support with no treatment, there is 100% removal in both the wet and dry tests, showing that the adhesion of photographic emulsions to untreated PEN is unacceptable.

TABLE 2

| Example | Freq (kHz) | He Flow (L/m) | N₂ Flow (L/m) | Power (W) | Speed (FPM) | Dry Test (% Rem) | Wet Test (% Rem) |
|---|---|---|---|---|---|---|---|
| 1 | 450 | 40 | 4 | 192 | 10 | 0 | 0 |
| 2 | 450 | 40 | 8 | 186 | 10 | 1 | 0 |
| 3 | 450 | 40 | 0 | 168 | 30 | 3 | 0 |
| 4 | 450 | 40 | 8 | 188 | 30 | 0 | 0 |
| Comparative 1 | 10 | 8 | 0 | 400 | 10 | 1 | 100 |
| Comparative 2 | 10 | 8 | 0.32 | 468 | 10 | 0 | 86 |
| Comparative 3 | 10 | 8 | 3.2 | 396 | 10 | 2 | 100 |
| Comparative 4 | 10 | 0 | 8 | 426 | 10 | 2 | 1 |
| Comparative 5 | 10 | 8 | 0 | 438 | 30 | 2 | 100 |
| Comparative 6 | 10 | 8 | 0.32 | 482 | 30 | 0 | 100 |
| Comparative 7 | 10 | 80 | 3.2 | 376 | 30 | 1 | 100 |
| Comparative 8 | 10 | 0 | 80 | 396 | 30 | 1 | 100 |
| Comparative 9 | 10 | 0 | 0 | 490 | 30 | 1 | 100 |
| Comparative 10 | None | | | | | 100 | 100 |

The important and surprising result that is evident from the data in Table 2 is the dependence of the adhesion on power supply frequency. In all cases, at a frequency of 450 kHz the wet adhesion was perfect, and in two cases both the wet and dry adhesion were perfect. In spite of investigating an extensive set of conditions, under no circumstances was a treatment done at a conventional frequency of 10 kHz able to provide perfect wet adhesion. It was also found in the course of this work that in order to operate at a frequency of 450 kHz it was necessary to use helium as a carrier gas.

Roth et al (WO 94/28568) present an analysis of an atmospheric glow discharge device in which they calculate a lower limit for the frequency at which a discharge can be sustained. According to them, this frequency is given by $$\nu = \frac{eV}{\pi m \gamma d^2} \text{ Hz}$$

where e is the ionic charge, V is the root-mean-square discharge voltage, m is the ionic mass, γ is the ionic collision frequency (given by Roth et al as 6.8×10⁹ per second) and d is the plate separation for the discharge. At 450 kHz, the helium discharges of the present invention operate at an electrode separation of 0.76 mm with an rms voltage of 1100 V. According to Roth's teachings, the minimum frequency at which a discharge can be sustained under these conditions is 2.2 Mhz. The effective treatment above operate at 450 kHz, which is 5 times lower than the lower limit that Roth teaches.

These results demonstrate that treatments of polymer support is helium or mixtures of helium with other reactive gases, done at the right frequencies, can significantly improve the adhesion of emulsion directly to the support. These types of results are not possible with conventional corona treatments, which are typically done in the frequency range from 3 to 40 kHz.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of treating a polymeric support at atmospheric pressure comprising:

providing more than one metallic active electrodes arranged to face a drum shaped metallic electrode;

pumping a gas comprising helium to the drum shaped metallic electrode;

connecting a power supply having a frequency between 40 kHz and 500 kHz between the active electrodes and the drum electrode, transporting a polymeric web-shaped material over the drum shaped electrode so that it is exposed to the atmospheric glow discharge produced by the active electrodes.

2. The method described in claim 1, wherein the active electrodes are covered by an insulating material.

3. The method described in claim 1, wherein the drum shaped electrode is covered with an insulating layer.

4. The method described in claim 2, wherein the drum electrode is covered with an insulating layer.

5. The method of claim 1, wherein the volume surrounding the device is filled with a mixture of nitrogen and helium gas.

6. The method of claim 1, wherein the volume surrounding the device is filled with a mixture of oxygen and helium gas.

7. The method of claim 1, wherein helium gas is made to flow into the discharge region through the active electrodes or by means of gas distribution bars.

8. The method of claim 5, wherein the gas is made to flow into the discharge region through the active electrodes or by means of gas distribution bars.

9. The method of claim 6, wherein the gas is made to flow into the discharge region through the active electrodes of by means of gas distribution bars.

10. The method of claim 1, wherein the polymeric support comprises a polyester.

11. The method of claim 10, wherein the polyester is polyethylene terephthalate.

12. The method of claim 10, wherein the polyester is polyethylene naphthalate.

13. The method of claim 1, further comprising:

coating the polymeric support with a photographic emulsion, antistatic layer, magnetic layer or lubricant layer after the polymeric support is subjected to the atmospheric glow discharge.

14. The method of claim 13, wherein the polymeric support is first treated with a layer of gelatin and then coated with a photographic emulsion.

15. A method of treating a polymeric support at atmospheric pressure comprising:

providing more than one metallic active electrodes arranged to face a drum shaped metallic electrode;

pumping a gas comprising helium through gas distribution bars containing slits which may distribute flow to the electrode arrangement wherein the slits are sealed to the electrodes;

connecting a power supply during a frequency between 40 kHz and 500 kHz between the active electrodes and the drum electrode; and transporting a polymeric web-shaped material over the drum shaped electrode so that it is exposed to the atmospheric glow discharge produced by the active electrodes.

16. The method of claim 15, wherein the slits are sealed to the electrodes with silicone rubber.

17. The method described in claim 15, wherein the active electrodes are covered by an insulating material.

18. The method described in claim 15, wherein the drum shaped electrode is covered with an insulating layer.

19. The method of claim 15, wherein the volume surrounding the device is filled with a mixture of nitrogen and helium gas.

20. The method of claim 15, wherein the volume surrounding the device is filled with a mixture of oxygen and helium gas.

21. The method of claim 15, wherein helium gas is made to flow into the discharge region through the active electrodes or by means of gas distribution bars.

22. The method of claim 15, wherein the gas is made to flow into the discharge region through the active electrodes or by means of gas distribution bars.

23. The method of claim 15, wherein the polymeric support comprises a polyester.

24. The method of claim 15, wherein the polyester is polyethylene terephthalate.

25. The method of claim 15, wherein the polyester is polyethylene naphthalate.

26. The method of claim 15, further comprising:

coating the polymeric support with a photographic emulsion, antistatic layer, magnetic layer or lubricant layer after the polymeric support is subjected to the atmospheric glow discharge.

27. The method of claim 15, wherein the polymeric support is first treated with a layer of gelatin and then coated with a photographic emulsion.

* * * * *